Figure 1:
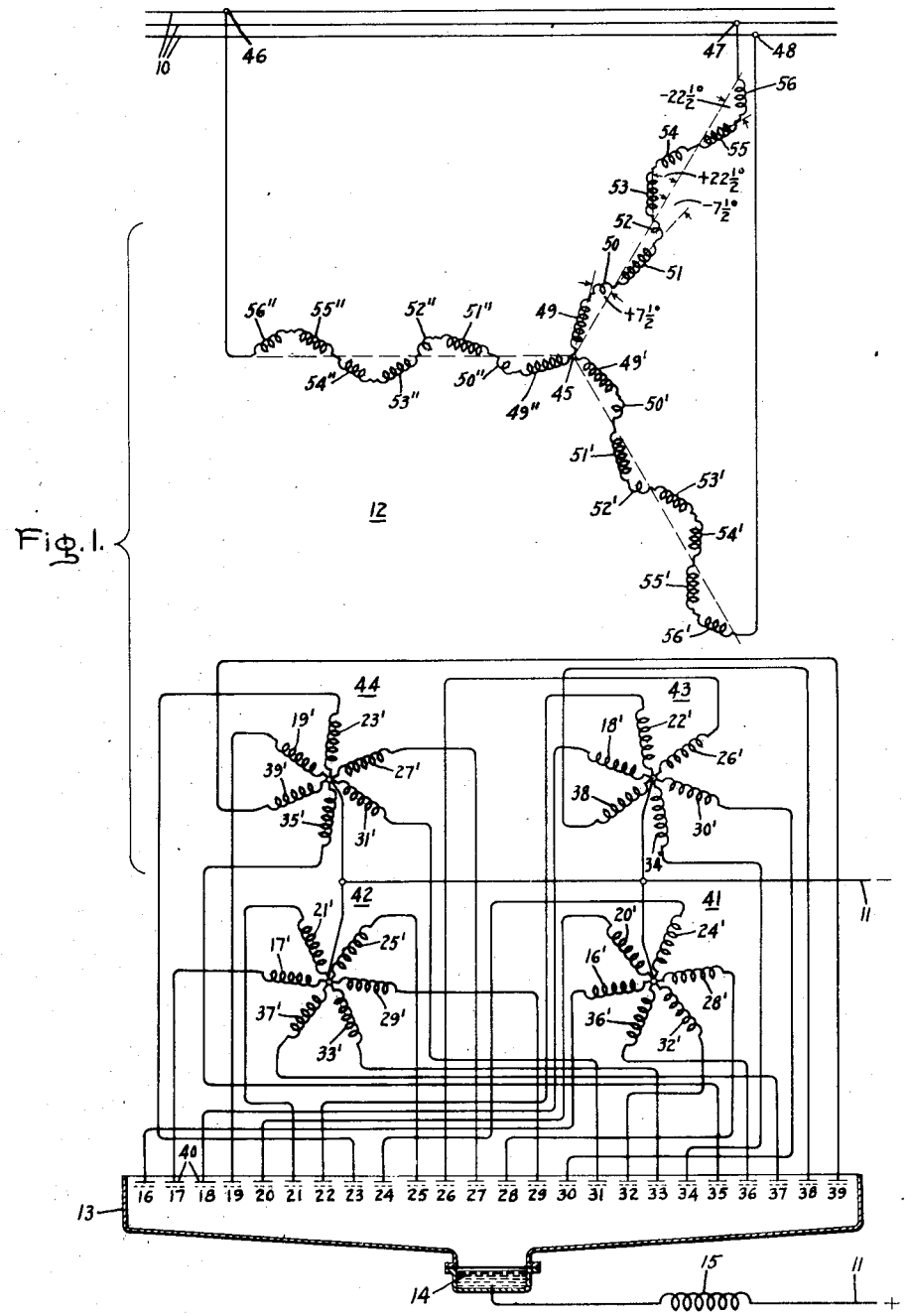

May 27, 1941.  W. M. GOODHUE  2,243,558
ELECTRIC TRANSLATING SYSTEM
Filed Sept. 1, 1939  3 Sheets-Sheet 1

Inventor:
William M. Goodhue,
by Harry E. Dunham
His Attorney.

May 27, 1941.    W. M. GOODHUE    2,243,558
ELECTRIC TRANSLATING SYSTEM
Filed Sept. 1, 1939    3 Sheets-Sheet 3

Inventor:
William M. Goodhue,
by Harry E. Dunham
His Attorney.

Patented May 27, 1941

2,243,558

UNITED STATES PATENT OFFICE 2,243,558

ELECTRIC TRANSLATING SYSTEM

William M. Goodhue, Cambridge, Mass., assignor to General Electric Company, a corporation of New York Application September 1, 1939, Serial No. 293,072

4 Claims. (Cl. 175—363)

My invention relates to electric translating systems and more particularly to such systems including transforming apparatus and electric valve means for transmitting energy between a pair of electric translating circuits. While my invention is of general application, it is particularly suitable for transmitting energy from a polyphase alternating current circuit to a direct current circuit through an electric valve converting apparatus.

It is well known in the art that when transmitting energy from an alternating current supply circuit to a direct current load circuit through an electric valve converting apparatus the voltage regulation of the system and the wave form of both the alternating and direct current circuits are improved and the inductive interference decreased by increasing the equivalent number of phases of the secondary windings of the rectifier transformer. Also, when the specified load on a rectifier exceeds a certain order of magnitude it becomes necessary from the standpoint of efficiency (arc drop) to increase the number of phases. Furthermore, since the capacity of electric valve converting apparatus has, in recent years, been increased in a greater proportion relative to the increase in capacity of generating plants, it becomes necessary to increase the number of phases of the electric valve converting apparatus in order to prevent overheating of the rotors of the generating apparatus. Electric valve translating systems up to twelve phases have been used to a considerable extent, but difficulties have been encountered when it has been desired to increase the number of phases beyond this. In copending applications for Letters Patent Serial No. 235,623, filed October 18, 1938, by Everett F. Christensen, and Serial No. 272,170, filed May 6, 1939, by Carl C. Herskind, both assigned to the same assignee as the present application, electric valve translating systems having twenty-four phases have been described and claimed. In both of these applications, however, interphase transformers are provided in order to obtain good utilization of the electric valve converting apparatus. In certain applications where large amounts of power are required, interphase transformers, because of the harmonic potentials introduced, tend to cause inductive interference with communication circuits. My invention is particularly concerned with a twenty-four phase electric valve translating apparatus wherein interphase transformers, and the like, are dispensed with entirely and yet high utility of the apparatus is obtained with each of the electric discharge paths conducting current for substantially 180 degrees of the cycle of the alternating potential circuit.

In addition to eliminating the use of an interphase transformer I also obtain by my invention forced balancing of the currents between the various anodes of the rectifier by arranging the primary windings of the rectifier transformer in series zigzag to also produce the phase displacement required for proper excitation of the secondary windings. An advantage is obtained by arranging the primary windings in series zigzag rather than the secondary windings since in view of the higher voltages, more accurate turn ratios may be achieved. Overlapping of the anode currents is also obtained by arranging the cores of the transformer to permit the generation of harmonic voltages. My invention, relating to a twenty-four phase electric valve converting apparatus, is an improvement on the arrangement disclosed in United States Letters Patent No. 1,837,973, granted December 22, 1931, on an application to T. C. Lennox.

It is desirable that electric valve converting apparatus be constructed to supply half sine wave anode currents because a half sine wave anode current is very favorable to rectifier operation. In such an arrangement there is no sudden commutation of ionization as is the case with ordinary flat-topped waves generally used. Therefore, one cause of arc backs and bombardment of the anode is reduced. Accordingly my invention is designed to accomplish the above result and good utilization of the apparatus is obtained since each discharge path is conductive during substantially 180 degrees of the cycle of the alternating current circuit. Likewise, a very desirable wave shape results because of the forced balance of the load among the twenty-four anodes.

It is an object of my invention, therefore, to provide a new and improved electric valve converting apparatus.

It is another object of my invention to provide a twenty-four phase electric valve converting apparatus wherein a forced balance of load among the various anodes is obtained and wherein good utilization of the apparatus occurs without the use of interphase transformers of any kind.

It is a further object of my invention to provide a twenty-four phase rectifier of the forced balance type of circuit which will reduce the harmonics in both the direct and alternating current circuits to a minimum.

It is a still further object of my invention to provide an electric valve converting apparatus wherein one may obtain the phase displacement required for a twenty-four phase rectifier by an arrangement of the primary transformer windings so that more accurate turn ratios may be achieved.

It is another object of my invention to provide a new and improved electric valve converting apparatus for use where it is necessary to transmit electrical energy with good wave shape in both the supply and load circuits.

In accordance with the illustrated embodiment of my invention I provide a twenty-four phase electric valve converting apparatus utilizing a series zig-zag primary connection which tends to force the anode currents to be equal and also provides the necessary phase displacement of 15° between the twenty-four secondary phases. In view of the larger number of turns on the primary windings, more accurate turn ratios may be achieved than if the necessary phase displacement were obtained by arrangement of the secondary windings. A plurality of groups of secondary windings, each winding arranged in star or diametric relation, have their end terminals connected to the twenty-four anodes of the electric valve converting apparatus while the midpoints of the diametric connections are connected without interphase transformers directly to the negative side of the direct current circuit. The transformer windings are placed upon four cores each of which includes a zero phase sequence leg. By different arrangements of the zigs and zags in the primary winding a forced balance is obtained between the respective anode currents of the electric valve converting apparatus and all the odd harmonics up to and including the twenty-second are eliminated from both sides of the system.

My invention, both as to its organization and method of operation together with other and further objects thereof, will best be understood by reference to the description taken in connection with the accompanying drawings and its scope will be pointed out in the appended claims.

Figure 2:
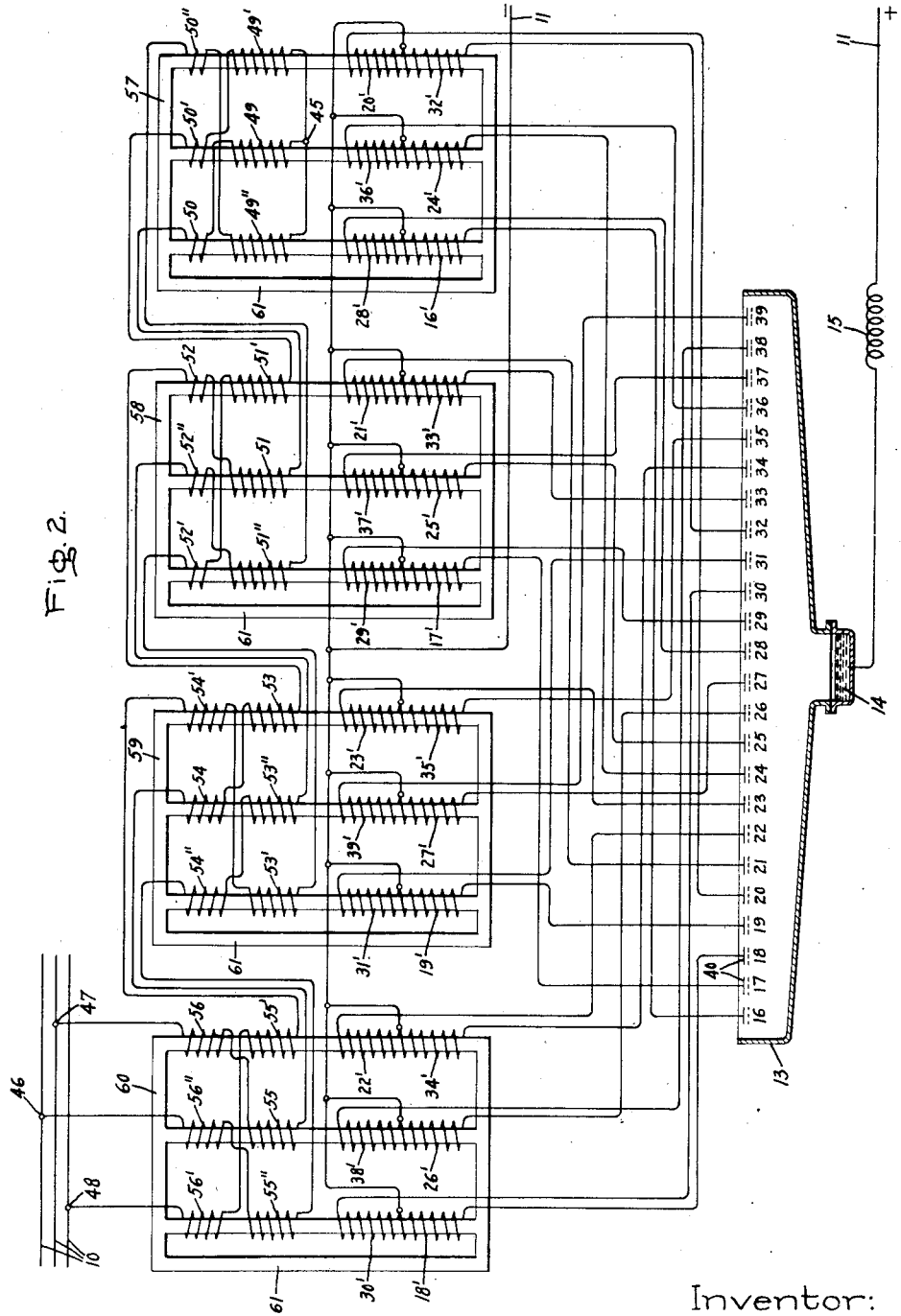
Figure 3:
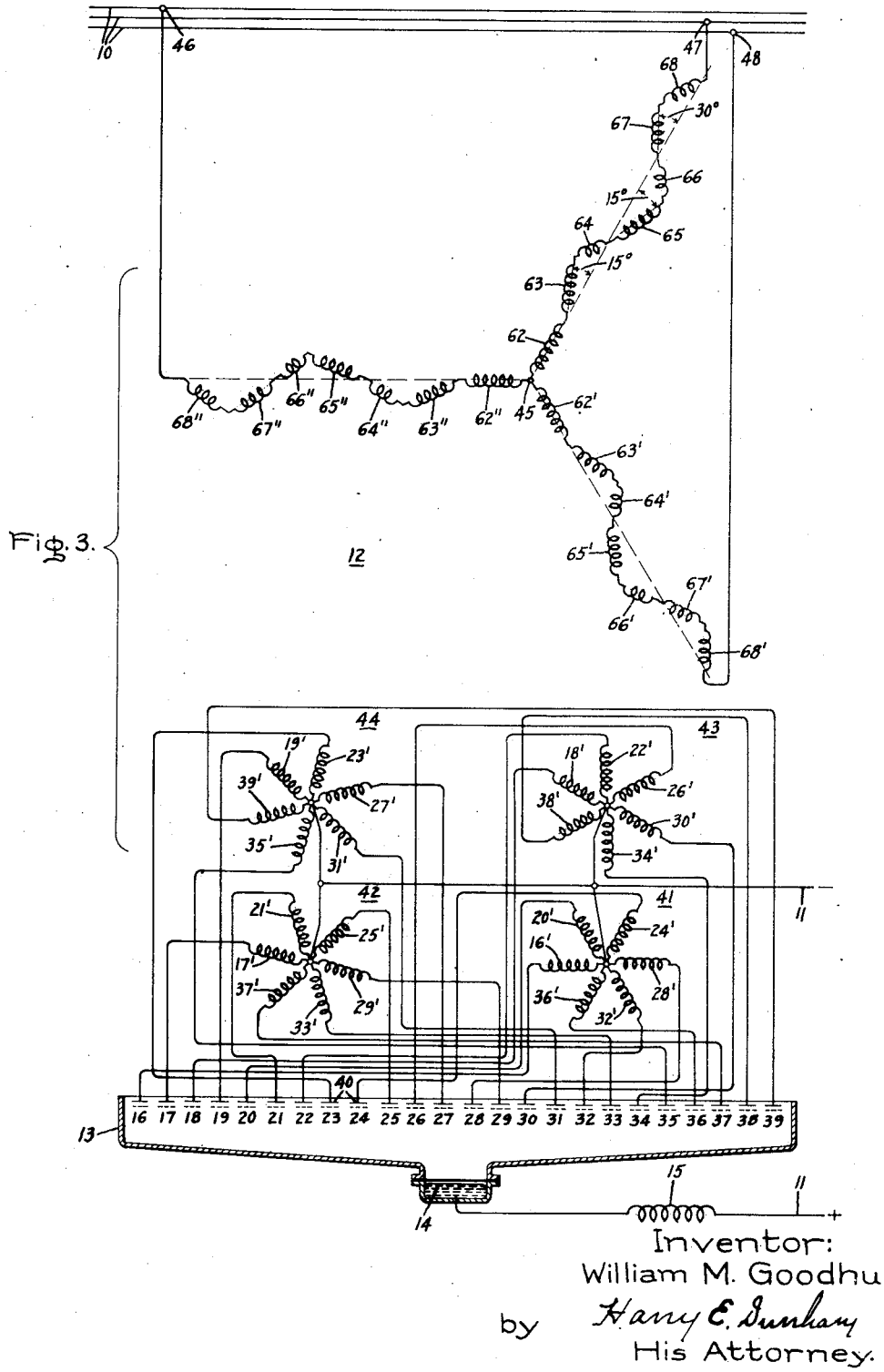

In the accompanying drawings, Fig. 1 illustrates an embodiment of my invention as applied to a twenty-four phase electric valve converting apparatus, while Fig. 2 discloses the transformer arrangement for the apparatus illustrated in Fig. 1; Fig. 3 illustrates a modification of my invention as illustrated in Fig. 1.

Referring now to Fig. 1 of the accompanying drawings, my invention is diagrammatically shown as applied to a twenty-four phase electric valve converting apparatus for transmitting energy between a polyphase alternating current circuit 10 having three phases to a direct current load circuit 11. The electric valve converting apparatus includes a transformer 12 and an electric discharge device 13 provided with a plurality of discharge paths 16 to 39 inclusive. Electric discharge device 13 is also provided with a single cathode 14 connected to the positive terminal of the direct current circuit through reactor 15. Each of the discharge paths 16 to 39 respectively is provided with an anode 40 and these anodes are connected to the terminals of the secondary phase windings 16' to 39' of transformer 12 which are associated with the respective discharge paths having the same reference numerals. Electric valve 13 may be any of the types of valves well known in the art but is preferably of the vapor electric discharge type. Although I have illustrated electric valve 13 as of the multi-anode, single-cathode type, it will be understood by those skilled in the art that a plurality of electric discharge valves each comprising a single cathode and a single anode contained within a separate envelope preferably also containing an ionizable medium, may equally well be used. If desired, suitable control electrodes or grids may be provided associated with each of the discharge paths 16 to 39 respectively. The secondary phase windings 16' to 39' of transformer 12 associated with discharge paths 16 to 39, respectively, are arranged in four six-phase star or diametrically connected groups 41, 42, 43, 44, respectively. The neutral points of each of these six-phase groups 41 to 44 are interconnected by suitable conductors, which in turn are directly connected to the negative terminal of the direct current circuit 11. In accordance with my invention, to obtain the necessary phase displacement of 15° on the secondary side and to obtain a forced balance between the respective anode currents, the primary coils of transformer 12 are wound in a Y-connected series zigzag arrangement and are provided with a neutral terminal 45 and with end terminals 46, 47 and 48, connected respectively to the three phases of alternating current circuit 10. One phase of this primary circuit includes series zigzag arranged coils 49 to 56 connected between neutral point 45 of the Y-connected primary winding and terminal 47. Similar primed reference numerals 49' to 56' characterize the corresponding series zigzag coils of the primary phase winding between the neutral terminal 45 and phase terminal 48, and similar double primed reference numerals 49" to 56" characterize the coils between the neutral point 45 and the terminal 46. These coils as shown in Fig. 2 are wound upon four separate three-phase transformer cores 57, 58, 59, and 60. It will be understood of course that an appropriate number of single phase cores could be used or even one single composite core. As illustrated in Fig. 1, coils 49 and 50 provide a forward displacement of seven and one-half degrees, while coils 51 and 52 furnish a backward displacement of seven and one-half degrees. These coils, as well as those with the same primed and double primed reference numerals are wound on cores 57 and 58 respectively, thus forming two transformers of the same design. Coils 53 and 54 furnish a forward displacement of twenty-two and one-half degrees, while coils 55 and 56 furnish a backward displacement of twenty-two and one-half degrees. These coils, as well as those with the same primed and double primed reference numerals, are wound on cores 59 and 60 respectively, thus forming two additional transformers of another design from that of the transformers including cores 57 and 58. As shown in Fig. 2, the four three-phase cores 57, 58, 59, and 60 are each provided with a fourth leg 61 for the zero phase sequence components of flux. The secondary phase windings 16' to 39' are each wound upon one of the legs of one of the three-phase cores so as to be inductively associated with the primary windings wound on the same core. By this arrangement of the primary windings a fifteen degree phase displacement is obtained between the various secondary phase windings 16' to 39' respectively, thereby producing the twenty-four phases suitable for use in connection with electric valve device 13. It will be noted that in this arrangement all of the necessary phase displacement is obtained in the primary winding which is usually the high voltage winding and therefore, in view of the larger number of turns involved, is better suited for obtaining the necessary voltage ratios than the low voltage secondary winding where very few turns are involved and where difficulties would be encountered if it were desired to obtain the fifteen degree phase displacement by means of zigzagging the secondary windings. In order to obtain the seven and one-half degree phase displacements necessary in the primary winding of transformer 12 the ratio of turns of the short coil to the long coil, for example the ratio of turns of coil 50 to 49 and 52 to 51 must be .165. For the twenty-two and one-half degree phase displacement the ratio of turns of the short coil to the long coil, for example the ratio of turns of coil 54 to 53 and coil 56 to 55 must be .629. The primary currents must be such that they will equalize at the neutral point 45 and the current in each of the zigzag coils is equal to and in phase with that of the remaining coils in that phase of the Y-connected group with which it is connected in series. Thus, in Fig. 1 the current flowing in winding 49 must be the same as that flowing in windings 50, 51, 52, 53, 54, 55, and 56. In view of this fact, a very important advantage is obtained, since, because the same current flows through these series-connected primary coils equal currents must flow in the respective secondary coils and hence the anode currents of the electric valve converting apparatus are equalized and consequently give more nearly perfect twenty-four phase operation than can usually be obtained from transformer arrangements which do not have a series-connected primary winding. By this arrangement also the current in the secondary windings very closely approximates a half sine wave which is ideal for commutation purposes.

It will be understood by those skilled in the art that all the odd harmonics up to the twenty-third will be eliminated. In view of the forced balance conditions the impedance offered by the transformer to all odd harmonics between the fundamental and the twenty-third are infinite. With the zigzagging illustrated in Fig. 1 of plus seven and one-half degrees, minus seven and one-half degrees, plus twenty-two and one-half degrees and minus twenty-two and one-half degrees, the displacements of the harmonic currents will be similar to the degree of zigzag mentioned above except that this displacement when considered in terms of degrees on the harmonic base will be equal to the number of degrees on the fundamental base multiplied by the order of the harmonics increased or decreased by one, depending upon which of the odd harmonics are being considered. Considering for example, the fifth harmonic, the following displacements of harmonic voltage will occur: The harmonic voltage across coils 49 and 50, for example, will be displaced plus forty-five degrees, while the fifth harmonic voltage appearing across the coils 51 and 52 will be displaced minus forty-five degrees. Similarly, the displacement of the harmonic voltage appearing across the outer terminal of coils 53 and 54 will be plus one hundred thirty-five degrees and the harmonic voltage appearing across the coils 55 and 56 will be minus one hundred thirty-five degrees. These displacements are obtained by multiplying the displacement of the fundamental by the number of the harmonic plus one or five plus one. Since these voltages are equal and opposite, they will add to zero and no primary current can flow due to a fifth harmonic secondary voltage so that the fifth harmonic set of impedances are infinite. The displacement of the harmonic voltages for the seventh harmonic are obtained by multiplying the displacements of the fundamental by seven minus one or six, which is the same as the number utilized for obtaining the displacement of the fifth harmonic. It will be understood that the same test can be applied to any of the odd harmonics up to the twenty-third which will not be present in either the alternating current or direct current circuits.

The operation of the apparatus illustrated in Figs. 1 and 2 will be well understood by those skilled in the art. Each of the electric discharge paths 16 to 39 will be conductive for substantially 180 degrees, that is, electric discharge paths 16 and 28, for example, will function just like an ordinary biphase rectifier, each discharge path being conductive for substantially 180 degrees and the electric discharge device 13 then operates in the same manner as if twelve biphase rectifiers, each successively displaced in phase from one another by fifteen electrical degrees were operating to give a twenty-four phase ripple in the direct current circuit 11. Under load conditions, therefore, approximately half of the electric discharge paths 16 to 39 are conductive at the same time and the utility factor of the electric valve converting apparatus therefore is very high.

A considerable saving in costs is obtained by the elimination of the interphase transformer. This is possible because the four main transformer cores are connected in series from line to neutral whereby it is possible to have distorted voltages on the individual primary coils, even though the total primary voltage is sinusoidal. Hence, in this arrangement the interphase transformer flux appears in the main transformer core and since this flux has a triple harmonic characteristic it is necessary for the transformer cores to be provided with a fourth or zero phase sequence component leg 61 to act as a return path for this triple frequency flux which flows in phase in all three of the wound legs of each transformer core.

In Fig. 3 I have illustrated an electric valve converting apparatus embodying my invention wherein the primary winding of transformer 12 has a different arrangement of coils than the arrangement illustrated in Figs. 1 and 2, and three different transformer designs are necessary instead of two as illustrated in Figs. 1 and 2. The same reference numerals have been retained for corresponding parts of the apparatus. The primary winding of transformer 12 is provided with coils 62 to 68, 62' to 68', and 62'' to 68'' in each of the respective phases connected between the neutral terminal 45 and terminals 47, 48, and 46, associated with the alternating current circuit 10. Coils 62, 62' and 62'' have no short coils and give zero phase displacement. Coils 63 and 64 and the corresponding primed and double primed coils give a positive phase displacement of fifteen degrees, while coils 65 and 66 and the corresponding primed and double primed coils give a negative phase displacement of fifteen degrees. Coils 67 and 68 and the corresponding primed and double primed coils give a positive phase displacement of thirty degrees. As in Fig.

1, four transformer cores are required, three of these transformers being of different design, that is, one transformer design will include primary coils 62 to 62'', another design will include coils 67 and 68 and the corresponding primed and double primed coils, while the third design will comprise the coils which give the positive or negative fifteen degree phase displacement. Except for the arrangement of the primary coils the apparatus illustrated in Fig. 3 functions in an identical manner with the arrangement described in Figs. 1 and 2, as will be well understood by those skilled in the art. The ratio of turns of the short coil to the long coil for obtaining the fifteen degree displacement, for example the ratio of turns of coil 64 to coil 63, and coil 66 to coil 65 is equal to .366. To obtain a thirty degree phase displacement the ratio of turns of the coils, for example the ratio of turns of coil 68 to 67, is equal to unity. To obtain the zero degree phase displacement the ratio of the short coil to the long coil will naturally be zero, as illustrated for example by coil 62.

Although I have described my electric valve converting apparatus as particularly adapted for transmitting energy from an alternating current supply circuit to a direct current load circuit, it will be understood by those skilled in the art that this apparatus will function equally well as an inverter for transmitting energy from a direct current supply circuit to an alternating current load circuit. In the latter case, as will be understood by those skilled in the art, control electrodes and control circuits therefor may be required.

While I have shown and described my invention in connection with certain specific embodiments, it will of course be understood that I do not wish to be limited thereto, since it is apparent that the principles herein disclosed are susceptible of numerous other applications and modifications may be made in the circuit arrangement and in the instrumentalities employed without departing from the spirit and scope of my invention as set forth in the appended claims.

What I claim as new and desire to secure by Letters Patent of the United States, is:

1. In an electric valve converting system, a direct current circuit, an alternating current circuit, electric translating apparatus interconnecting said circuits including a plurality of electric valves and transforming means comprising a primary winding including a plurality of long and short coils connected in series zigzag relation, a twenty-four phase secondary winding and four three-phase transformer cores each provided with a leg for zero phase sequence components of flux, the turns of the long and short coils of said primary windings being so proportioned and arranged on said cores as to produce a fifteen degree displacement between the phases of said secondary winding, and to cause current to be carried by each of said secondary phase windings during substantially 180 degrees of the cycle of the potential of said alternating current circuit.

2. The combination of a plurality of electric discharge valves, a transformer including a twenty-four phase diametric secondary winding for energizing said electric discharge valves, a primary winding comprising a plurality of coils connected in series zigzag relation for each phase of said alternating current circuit and a plurality of core structures, said secondary windings and the coils of said primary windings being arranged on said core structures to produce phase displacements of seven and one-half degrees and twenty-two and one-half degrees in both the positive and negative directions with respect to the line-to-neutral voltages of said alternating current supply circuit so as to produce twenty-four phase secondary voltages and to maintain the electric discharge valves associated with said diametric winding conductive for intervals of substantially 180 electrical degrees.

3. The combination comprising a plurality of electric discharge paths and a phase multiplying transformer including a twenty-four phase secondary winding connected to energize said discharge valves, a primary winding comprising a plurality of coils connected in series zigzag relation and a plurality of core structures, said primary coils and said secondary windings being arranged on said core structures to produce phase displacements between said secondary windings of zero degrees, fifteen degrees in both positive and negative directions, and thirty degrees in one direction with respect to the line-to-neutral voltages of said primary winding so that fifteen degrees displacement is produced between each of the phases of said secondary winding.

4. A phase multiplying transformer for energizing the electric discharge paths of an electric valve converting system comprising a polyphase primary winding including a plurality of long and short coils connected in series zigzag relation for each primary phase, a twenty-four phase secondary winding including four inductive networks, four magnetic core structures each having a leg for zero phase sequence flux and three winding legs, two coils from different phases of said primary winding and a portion of one of said secondary networks including two phase terminals being wound on each winding leg, the turns of each of said primary coils and the phase relation thereof being such that the voltages induced in said secondary winding are electrically displaced fifteen degrees with respect to each other.

WILLIAM M. GOODHUE.